United States Patent
Liu et al.

(10) Patent No.: US 11,400,477 B2
(45) Date of Patent: Aug. 2, 2022

(54) REVERSIBLE NOZZLE IN ULTRASONIC ATOMIZER FOR CLOG PREVENTION

(71) Applicant: Ford Motor Company, Dearborn, MI (US)

(72) Inventors: Wanjiao Liu, Ann Arbor, MI (US); Kevin Richard John Ellwood, Ann Arbor, MI (US); Mark Edward Nichols, Saline, MI (US); Christopher Michael Seubert, New Hudson, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 16/211,320

(22) Filed: Dec. 6, 2018

(65) Prior Publication Data

US 2019/0232320 A1  Aug. 1, 2019

Related U.S. Application Data

(60) Provisional application No. 62/624,013, filed on Jan. 30, 2018.

(51) Int. Cl.
*B05B 17/00* (2006.01)
*B05B 13/04* (2006.01)
(Continued)

(52) U.S. Cl.
CPC .......... *B05B 17/0646* (2013.01); *B05B 1/262* (2013.01); *B05B 3/02* (2013.01);
(Continued)

(58) Field of Classification Search
CPC ... B05B 1/262; B05B 15/628; B05B 17/0669; B05B 13/0431; B05B 12/00;
(Continued)

(56) References Cited

U.S. PATENT DOCUMENTS

| 4,038,570 A | 7/1977 | Durley, III |
| 4,583,694 A * | 4/1986 | Williams ................ B05B 15/00 |
| | | 239/289 |

(Continued)

FOREIGN PATENT DOCUMENTS

| CN | 103736620 | 4/2014 |
| CN | 104689946 | 6/2015 |

(Continued)

OTHER PUBLICATIONS

Hielscher—Ultrasound Technology, Ultrasonic Spraying, Nebulizing, and Atomizing, Sep. 17, 2018.

(Continued)

*Primary Examiner* — Steven M Cernoch
(74) *Attorney, Agent, or Firm* — Burris Law, PLLC

(57) ABSTRACT

A nozzle for an atomizer includes a plate, a piezoelectric actuator, a body, and a connector. The plate defines an aperture. The actuator is configured to oscillate the plate. The body supports the plate. The connector is configured to reversibly mount the body to the atomizer in a first orientation and in a second orientation. In the first orientation, fluid exits the nozzle along a first axial direction through the aperture. In the second orientation, fluid exits the nozzle along an opposite axial direction through the aperture.

15 Claims, 6 Drawing Sheets

Figure 1:
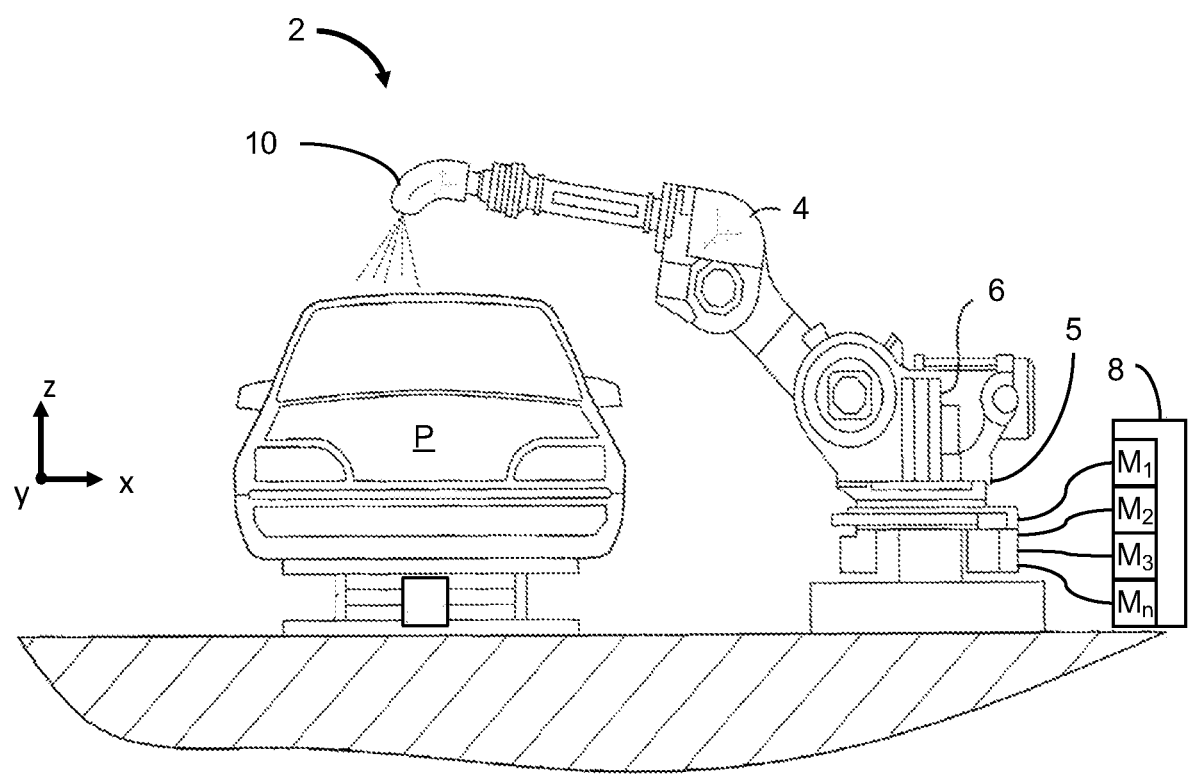

(51) Int. Cl.

| | |
|---|---|
| *B05B 17/06* | (2006.01) |
| *B05B 3/14* | (2006.01) |
| *B05B 3/02* | (2006.01) |
| *B05B 15/628* | (2018.01) |
| *B05B 12/36* | (2018.01) |
| *B05B 15/625* | (2018.01) |
| *B05B 12/16* | (2018.01) |
| *B05B 7/14* | (2006.01) |
| *B25J 11/00* | (2006.01) |
| *B05B 12/00* | (2018.01) |
| *B05B 15/68* | (2018.01) |
| *B05B 1/26* | (2006.01) |
| *B05D 1/02* | (2006.01) |
| *B05B 15/00* | (2018.01) |
| *B05D 1/12* | (2006.01) |
| *B05D 3/06* | (2006.01) |

(52) U.S. Cl.
CPC .............. *B05B 3/14* (2013.01); *B05B 7/1481* (2013.01); *B05B 12/00* (2013.01); *B05B 12/16* (2018.02); *B05B 12/36* (2018.02); *B05B 13/0431* (2013.01); *B05B 13/0452* (2013.01); *B05B 15/00* (2013.01); *B05B 15/625* (2018.02); *B05B 15/628* (2018.02); *B05B 15/68* (2018.02); *B05B 17/06* (2013.01); *B05B 17/063* (2013.01); *B05B 17/0653* (2013.01); *B05B 17/0669* (2013.01); *B05D 1/02* (2013.01); *B05D 1/12* (2013.01); *B05D 3/067* (2013.01); *B25J 11/0075* (2013.01)

(58) Field of Classification Search
CPC ... B05B 17/0653; B05B 17/06; B05B 17/063; B05B 3/14; B05B 13/0405; B05B 15/00; B05B 12/36; B05B 3/02; B05B 17/0646; B05B 15/625; B05B 7/1481; B05B 12/16; B05B 13/0452; B05B 15/68; B25J 11/0075; B05D 1/02; B05D 1/12; B05D 3/067

See application file for complete search history.

(56) References Cited

U.S. PATENT DOCUMENTS

| | | | |
|---|---|---|---|
| 5,387,444 A | 2/1995 | Bachmann | |
| 5,516,043 A | 5/1996 | Manna et al. | |
| 5,540,384 A | 7/1996 | Erickson et al. | |
| 5,624,075 A | 4/1997 | Dankert | |
| 5,636,798 A | 6/1997 | Buschor | |
| 5,669,971 A | 9/1997 | Bok et al. | |
| 5,823,428 A | 10/1998 | Humberstone et al. | |
| 6,206,301 B1* | 3/2001 | Pruett | B05B 15/52 239/119 |
| 6,394,363 B1 | 5/2002 | Arnott et al. | |
| 6,666,835 B2 | 12/2003 | Martin et al. | |
| 6,755,985 B2 | 6/2004 | Fiala et al. | |
| 6,896,193 B2* | 5/2005 | Helf | B05B 17/0607 128/200.16 |
| 7,168,633 B2 | 1/2007 | Wang et al. | |
| 7,350,890 B2 | 4/2008 | Baird et al. | |
| 7,550,897 B2 | 6/2009 | Hailes | |
| 7,704,564 B2 | 4/2010 | DeRegge et al. | |
| 7,934,665 B2 | 5/2011 | Erickson et al. | |
| 7,976,135 B2 | 7/2011 | Brown et al. | |
| 7,977,849 B2 | 7/2011 | Hailes et al. | |
| 8,016,209 B2* | 9/2011 | Hess | A01M 1/2044 239/102.2 |
| 8,191,982 B2 | 6/2012 | Brown et al. | |
| 8,317,299 B2 | 11/2012 | Brown | |
| 8,440,014 B2 | 5/2013 | Kitamura et al. | |
| 8,524,330 B2 | 9/2013 | Fan et al. | |
| 8,821,802 B2 | 9/2014 | Haran | |
| 9,149,750 B2 | 10/2015 | Steele et al. | |
| 9,156,049 B2 | 10/2015 | Galluzzo et al. | |
| 9,452,442 B2 | 9/2016 | Selby et al. | |
| 9,592,524 B2 | 3/2017 | Fritz et al. | |
| 2006/0005766 A1 | 1/2006 | Gorges et al. | |
| 2007/0051827 A1* | 3/2007 | Shen | B05B 17/0646 239/102.2 |
| 2007/0102537 A1 | 5/2007 | Stauch et al. | |
| 2010/0183820 A1 | 7/2010 | Seubert et al. | |
| 2010/0285234 A1 | 11/2010 | Van Den Berg et al. | |
| 2013/0079732 A1* | 3/2013 | Burt | B05B 17/0607 604/290 |
| 2014/0110500 A1 | 4/2014 | Crichton et al. | |
| 2016/0059262 A1 | 3/2016 | Seyler | |
| 2016/0158789 A1 | 6/2016 | Selby et al. | |
| 2016/0228902 A1 | 8/2016 | Crichton | |
| 2016/0310982 A1* | 10/2016 | Von Hollen | A61M 16/0054 |
| 2017/0225186 A1* | 8/2017 | Ferguson | B05B 1/18 |

FOREIGN PATENT DOCUMENTS

| | | |
|---|---|---|
| CN | 104841592 | 8/2015 |
| DE | 19631811 | 2/1998 |
| DE | 20023848 | 12/2006 |
| DE | 102011088373 | 6/2013 |
| DE | 102013205171 | 9/2014 |
| EP | 1884365 | 2/2008 |
| GB | 2215240 | 9/1989 |
| JP | H0538809 | 2/1993 |
| JP | H08215616 | 8/1996 |
| JP | 2003091010 | 3/2003 |
| KR | 20180080977 | 7/2018 |
| WO | 2018108572 | 6/2018 |
| WO | 2018162872 | 9/2018 |

OTHER PUBLICATIONS

IEEE GLOBALSPEC, Equipment information page for Spray Guns and Applicators Information, available at URL https://www.globalspec.com/learnmore/manufacturing_process_equipment/surface_coating_protection/coating_paint_spray_guns.

Ransburg, Evolver 303 Dual Purge Solventbome Robotic Atomizers, Model: A12374-XXX, Service Manual AA-08-01.5, May 2015.

Regan, Michael, UV Coatings: Curing at Light-Speed, BodyShop Business, May 1, 2005.

Beswick Engineering, The Basics of Quick Disconnects, product information pages, Beswick Engineering Co., Inc.

\* cited by examiner

REVERSIBLE NOZZLE IN ULTRASONIC ATOMIZER FOR CLOG PREVENTION

CROSS-REFERENCE TO RELATED APPLICATIONS

This application claims priority to provisional application 62/624,013 filed on Jan. 30, 2018. The disclosure of the above application is incorporated herein by reference.

FIELD

The present disclosure relates to high volume coating equipment and more specifically to an atomizer with a nozzle connector and a method of operating high volume coating equipment.

BACKGROUND

The statements in this section merely provide background information related to the present disclosure and may not constitute prior art.

Coating automotive vehicles (e.g., vehicle frames, bodies, panels, etc.) with coatings (e.g., primer, basecoat, clearcoat, etc.) in a high-volume production environment involves substantial capital cost, not only for application and control of the coating, but also for equipment to capture overspray. The overspray can be up to 40% of the coating that exits an applicator, or in other words, up to 40% of the coating that is purchased and applied is wasted (i.e. the transfer efficiency is ~60%). Equipment that captures overspray involves significant capital expenses when a paint shop is constructed, including large air handling systems to carry overspray down through a paint booth, construction of a continuous stream of water that flows under a floor of the paint booth to capture the overspray, filtration systems, and abatement, among others. In addition, costs to operate the equipment is high because air (flowing at greater than 200,000 cubic feet per minute) that flows through the paint booths must be conditioned, the flow of water must be maintained, compressed air must be supplied, and complex electrostatics are employed to improve transfer efficiency.

With known production equipment, the liquid coating is atomized by a nozzle that includes a rotating bell, which is essentially a rotating disk or bowl that spins at about 20,000-80,000 revolutions per minute. The liquid is typically ejected from an annular slot on a face of the rotating disk and is propelled towards the edges of the bell via centrifugal force. The liquid then forms ligaments and then droplets at the edges of the bell. Although this equipment works for its intended purpose, various issues arise as a result of its design. First, the momentum of the liquid coating is mostly lateral, meaning it is moving in a direction parallel to the vehicle rather than towards the vehicle. To compensate for this movement, shaping air is applied that redirects the liquid droplets towards the vehicle. In addition, electrostatics are used to steer the droplets towards the vehicle. The droplets have a fairly wide size distribution, which can cause appearance issues.

Ultrasonic atomization is an efficient means of producing droplets with a narrow size distribution with a droplet momentum perpendicular to the applicator surface (e.g., towards a surface of a vehicle). However, the small aperture size used for ultrasonic atomization can become clogged with debris or non-uniform or solid additives in the supplied liquid, such as metallic flakes mixed in a liquid basecoat of paint. Clogged apertures can cause uneven coating distribution and increased downtime to clean the nozzle.

The present disclosure addresses these issues associated with traditional high-volume production paint booth operations.

SUMMARY

This section provides a general summary of the disclosure and is not a comprehensive disclosure of its full scope or all of its features.

In one form, a nozzle for an atomizer includes a plate, a piezoelectric actuator, a body, and a connector. The plate defines an aperture. The actuator is configured to oscillate the plate. The body supports the plate. The connector is configured to reversibly mount the body to the atomizer in a first orientation and in a second orientation. In the first orientation, fluid exits the nozzle along a first axial direction through the aperture. In the second orientation, fluid exits the nozzle along an opposite axial direction through the aperture. In a variety of alternate forms of the present disclosure: the plate is disposed approximately midway between opposite axial ends of the body; the plate is symmetric along the first and second axial directions of the nozzle; the connector includes threads configured to engage mating threads on the atomizer; the actuator is configured to oscillate the plate in the first and second axial directions in response to an electric signal received by the actuator; the actuator is disposed about the plate; the actuator is integrally formed with the plate; the plate is one of a plurality of plates coupled to the body in an array, each plate defining at least one aperture; the plate defines a plurality of apertures; the connector is a quick-connect type connector; when the nozzle is in the first orientation the atomizer, the body, and a first side of the plate cooperate to define a reservoir, and wherein when the nozzle is in the second orientation the atomizer, the body, and an opposite side of the plate define the reservoir.

In another form, an atomizer for applying a coating includes a base and a nozzle. The nozzle is configured to receive fluid from the base. The nozzle includes a connector configured to mate with the base in a first orientation and a second orientation. In the first orientation, the fluid exits the atomizer through an aperture of the nozzle along a first axial direction through the aperture. In the second orientation, fluid exits along an opposite axial direction through the aperture. In a variety of alternate forms of the present disclosure: the nozzle includes a body and a plate, the connector being coupled to the body, the plate being coupled to the body and defining the aperture, the plate being configured to oscillate the aperture relative to the body; the nozzle further includes a piezoelectric actuator configured to oscillate the plate relative to the body in response to an electric signal received by the actuator; the atomizer further includes a robotic arm, the base being mounted on the robotic arm for movement therewith; the atomizer includes a plurality of the nozzles coupled to the base.

In yet another form, a method of applying a coating to a workpiece includes providing fluid from a base to a nozzle mounted on the base, oscillating a plate of the nozzle to cause the fluid to flow through an aperture in the plate along a first axial direction onto the workpiece, reversing an orientation of the plate relative to the base, and oscillating the plate so that fluid flows through the aperture along an opposite axial direction. In a variety of alternate forms of the present disclosure: the method further includes detecting a pressure of the fluid, determining that a blockage in the aperture is present based on a change in the pressure of the fluid, and reversing the orientation of the plate relative to the base in response to the blockage in the aperture being determined; the method further includes reversing the orientation of the plate relative to the base before providing a different fluid from the base to the nozzle; the method further includes reversing the orientation of the plate before coating a different workpiece.

Further areas of applicability will become apparent from the description provided herein. It should be understood that the description and specific examples are intended for purposes of illustration only and are not intended to limit the scope of the present disclosure.

DRAWINGS

Figure 2:
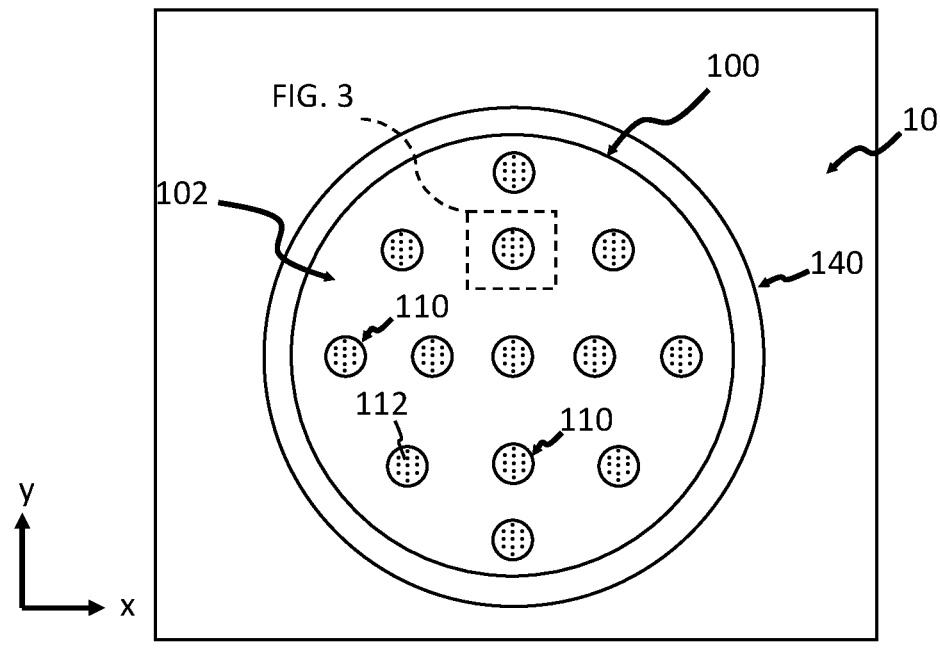
Figure 3:
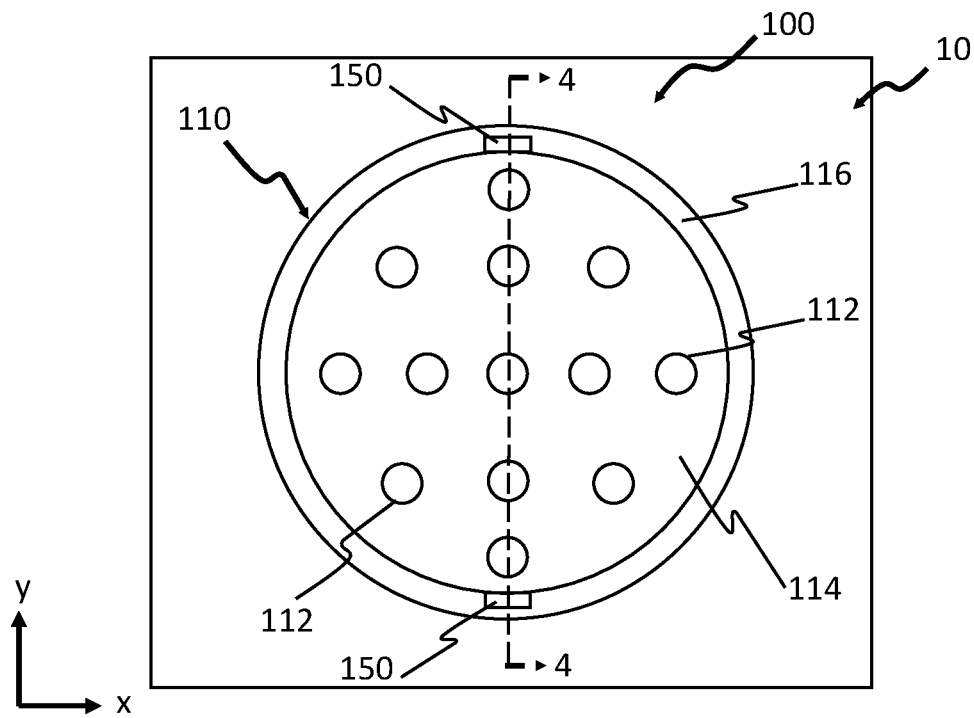
Figure 4:
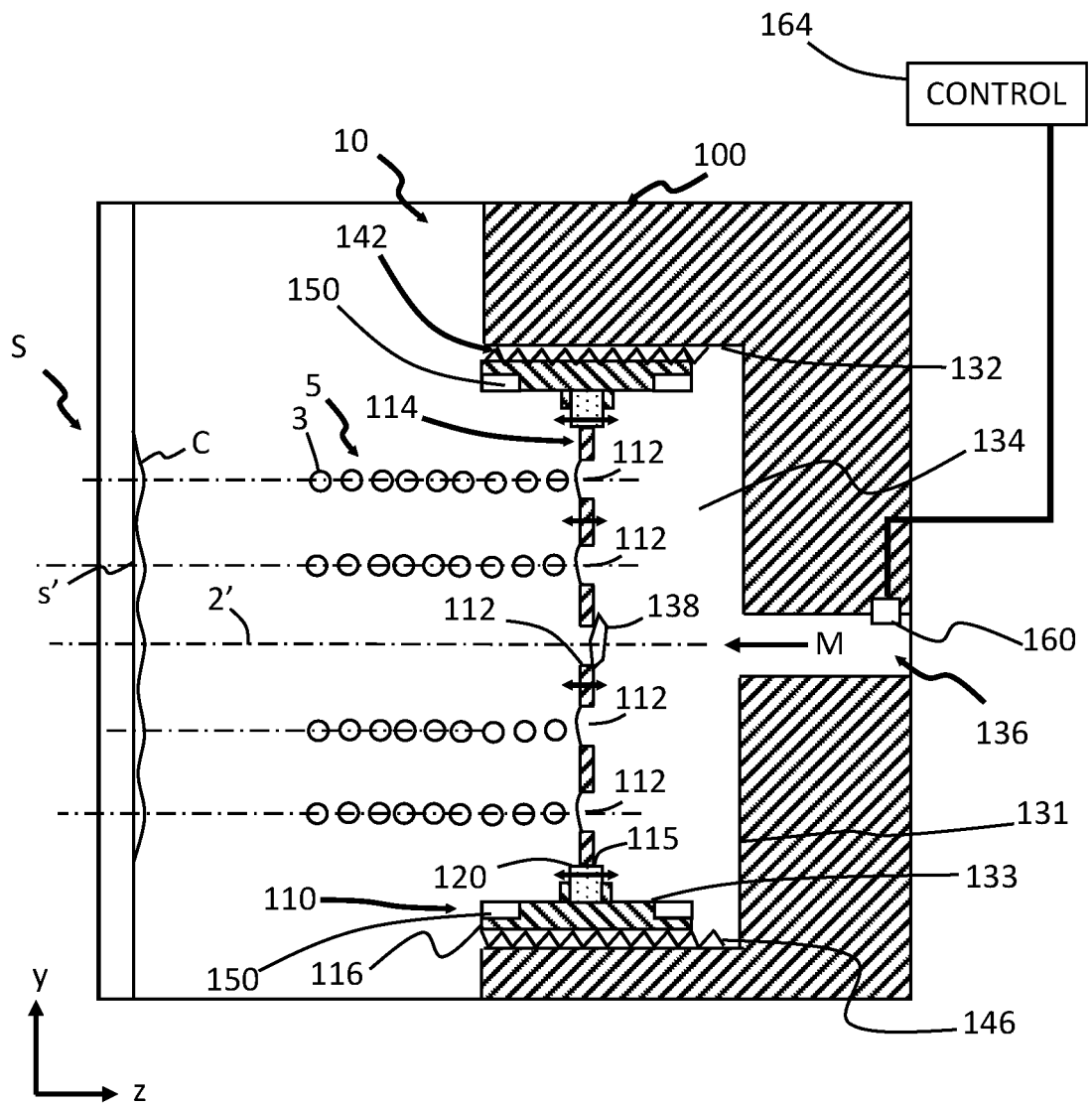
Figure 5:
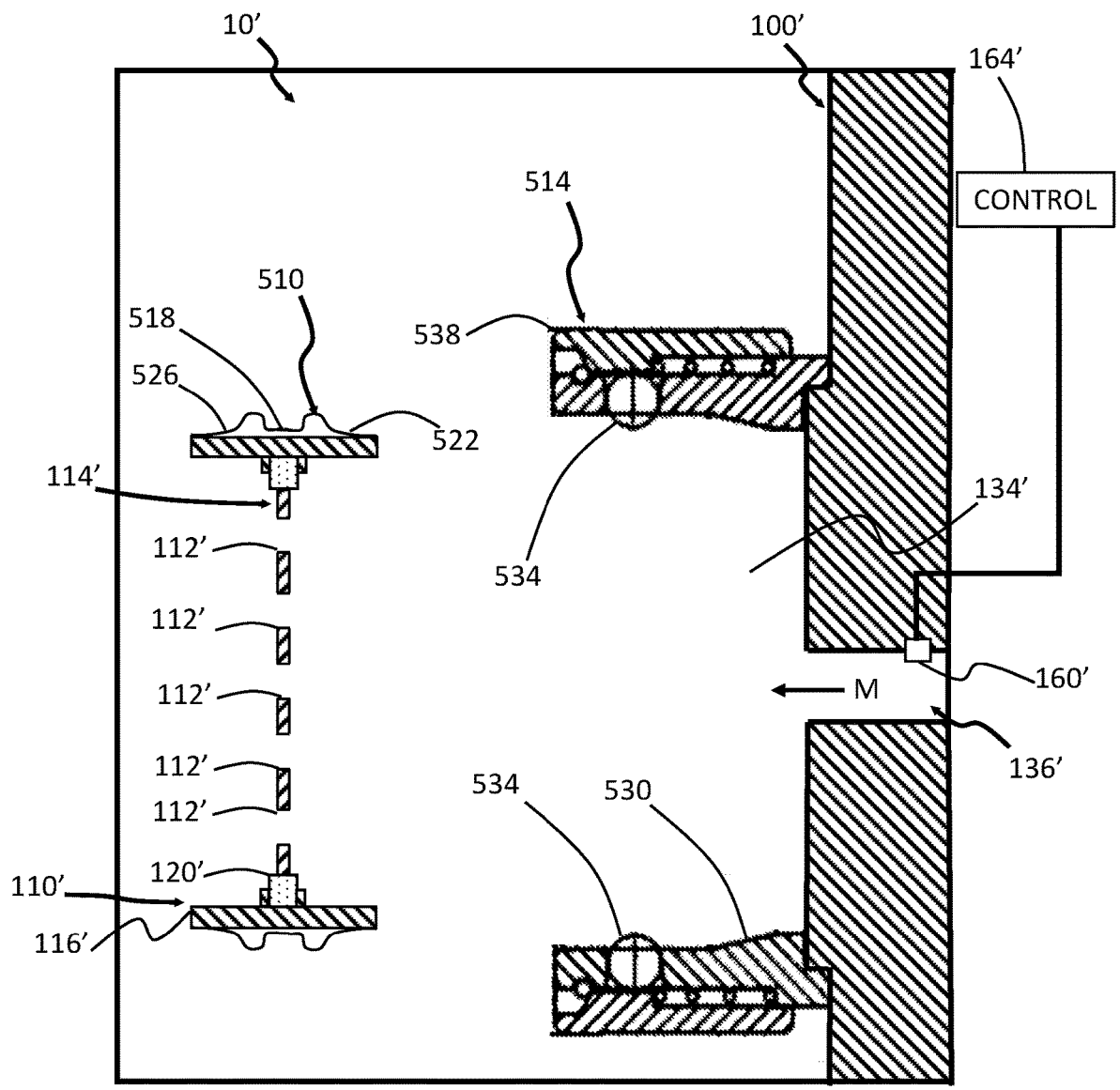
Figure 6:
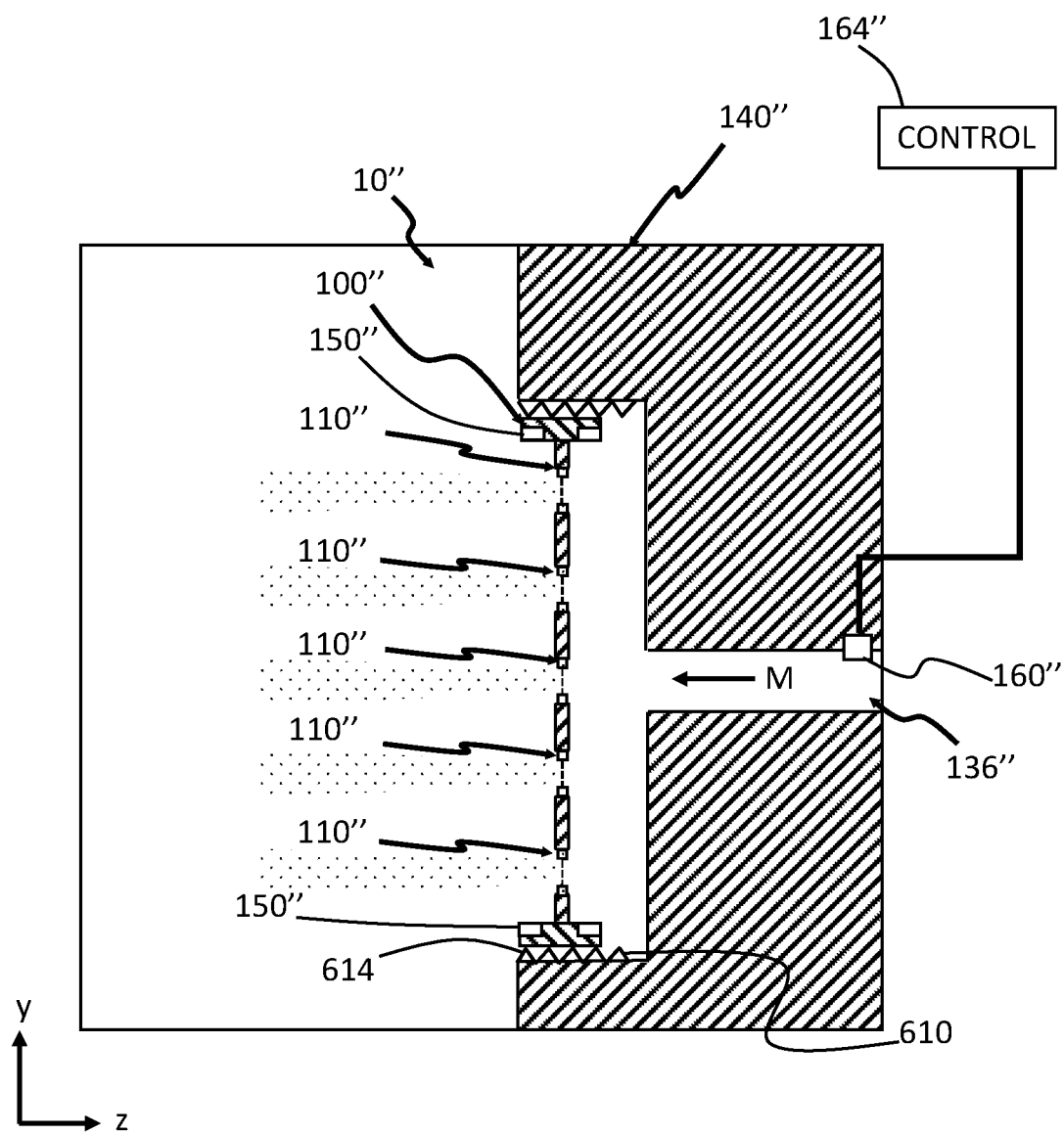
Figure 7:
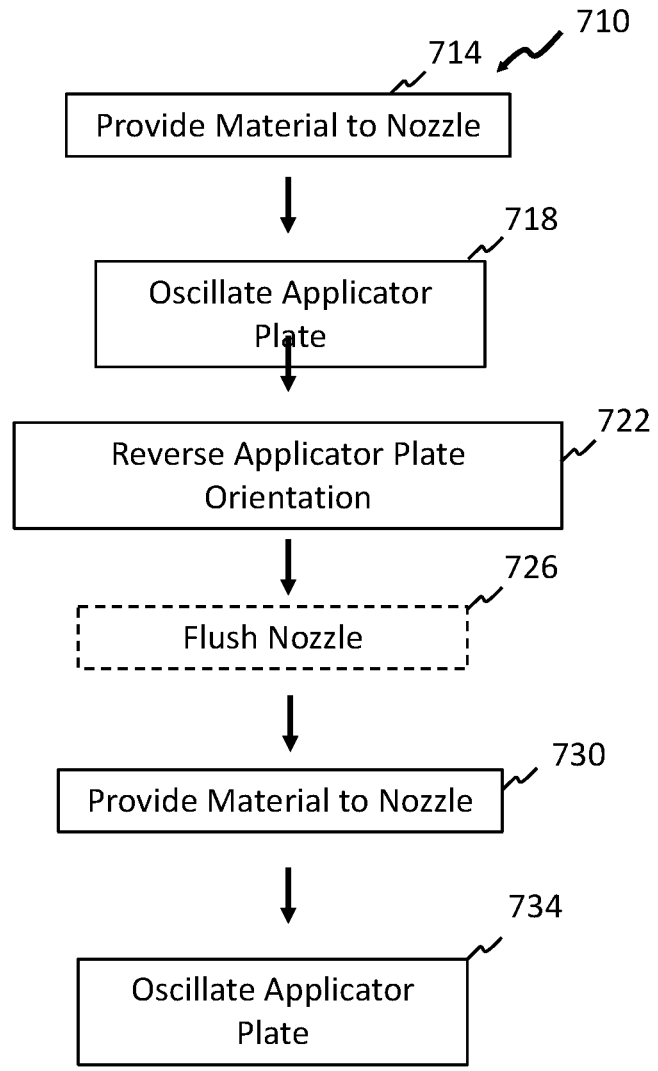

In order that the disclosure may be well understood, there will now be described various forms thereof, given by way of example, reference being made to the accompanying drawings, in which:

FIG. 1 is a planar view of an exemplary coating spray system according to the teachings of the present disclosure;

FIG. 2 schematically depicts a planar view of an applicator of the spray system of FIG. 1, having an array of micro-applicators according to the teachings of the present disclosure;

FIG. 3 schematically depicts a portion of the applicator of FIG. 2, illustrating one of the micro-applicators;

FIG. 4 schematically depicts a side cross-sectional view of section 4-4 in FIG. 3, illustrating a reversible nozzle according to the teachings of the present disclosure;

FIG. 5 schematically depicts a side cross-sectional view similar to FIG. 4, illustrating a reversible nozzle of a second construction according to the teachings of the present disclosure;

FIG. 6 schematically depicts a side cross-sectional view of an applicator of a second construction having a reversible nozzle with an array of micro-applicators according to the teachings of the present disclosure; and FIG. 7 schematically depicts a flow chart for a method of operating a reversible nozzle applicator according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

The present disclosure provides a variety of devices, methods, and systems for controlling the application of paint to automotive vehicles in a high production environment, which reduce overspray and increase transfer efficiency of the paint. It should be understood that the reference to automotive vehicles is merely exemplary and that other objects that are painted, such as industrial equipment and appliances, among others, may also be painted in accordance with the teachings of the present disclosure. Further, the use of "paint" or "painting" should not be construed as limiting the present disclosure, and thus other materials such as coatings, primers, sealants, cleaning solvents, among others, are to be understood as falling within the scope of the present disclosure.

Generally, the teachings of the present disclosure are based on a droplet spray generation device in which a perforate membrane is driven by a piezoelectric transducer. This device and variations thereof are described in U.S. Pat. Nos. 6,394,363, 7,550,897, 7,977,849, 8,317,299, 8,191,982, 9,156,049, 7,976,135, 9,452,442, and U.S. Published Application Nos. 2014/0110500, 2016/0228902, and 2016/0158789, which are incorporated herein by reference in their entirety.

Referring now to FIG. 1, a paint spray system 2 for painting a part P using a robotic arm 4 is schematically depicted. The robotic arm 4 is coupled to at least one material applicator 10 and a rack 5. A material source 8 (e.g., a paint source) is included and includes at least one material M (materials $M_1$, $M_2$, $M_3$, . . . $M_n$ shown in FIG. 1; also referred to herein simply as "material M"). In some aspects of the present disclosure the at least one material M includes different paint materials, different adhesive materials, different sealant materials, and the like. The arm 4 moves according to xyz coordinates with respect to rack 4 such that the material applicator 10 moves across a surface (not labeled) of the part P. Also, a power source 6 is configured to supply power to arm 4 and rack 5. Arm 4 and rack 5 are configured to supply material M from the material source 8 to the material applicator 10 such that a coating is applied to the surface of the part P.

Referring to FIG. 2 a material applicator 10 or atomizer according to the teachings of the present disclosure is schematically shown. In one form of the present disclosure, the material applicator 10 includes an array body 100 or nozzle with an applicator array 102 including a plurality of micro-applicators 110 or sub-nozzles. In some aspects of the present disclosure, the array body 100 with the applicator array 102 is positioned on a base 140. In one configuration, the base 140 is supported at the end of the articulating robotic arm 4 (FIG. 1). In another configuration, the base 140 is supported by a spray bar (not shown) which can be stationary or can move in one, two, or three dimensions relative to a substrate S (shown in FIG. 4). Each of the micro-applicators 110 includes a plurality of apertures 112 through which a material M (FIG. 4) is ejected such that atomized droplets 3 (FIG. 4) of the material is provided. As described above, the material M (FIG. 4) is generally a liquid material (e.g., primer, basecoat, clearcoat, etc.) but may optionally include interspersed solids, such as metallic flecks or other particles to provide a particular aesthetic look. The micro-applicators 110 can be arranged in any arrangement, such as a regular or an irregular pattern across the array body 100.

Referring to FIGS. 3 and 4, each of the micro-applicators 110 includes a nozzle body 116, a micro-applicator plate 114, and an actuator 120. Each micro-applicator plate 114 defines a plurality of the apertures 112 extending through the micro-applicator plate 114. The actuator 120 can be a transducer such as a piezoelectric material. The micro-applicator plate 114 is in mechanical communication with the actuator 120 such that activation of the actuator 120 (e.g., providing electrical power to the actuator 120) vibrates or oscillates the micro-applicator plate 114 as schematically depicted by the horizontal (z-direction) double-headed arrows in FIG. 4.

In the example provided, the array body 100 includes a material inlet 136 corresponding to each micro-applicator 110. The array body 100 includes a back wall 131 and a cylindrical sidewall 132 such that a reservoir 134 for containing the material M is provided between the back wall 131 and the micro-applicator plate 114. In the example provided, the back wall 131, the sidewall 132, a portion of the nozzle body 116 and the side of the micro-applicator plate 114 that faces the back wall 131 cooperate to define the reservoir 134. The inlet 136 is in fluid communication with the reservoir 134 such that the material M flows through the inlet 136 and into the reservoir 134. In the example provided, the actuator 120 is positioned between the micro-applicator plate 114 and the nozzle body 116 so that the nozzle body 116 supports the actuator 120 and the actuator 120 supports the micro-applicator plate 114. For example, the actuator 120 may be positioned between an outer edge surface 115 of the micro-applicator plate 114 and an inner surface 133 of the nozzle body 116. In one configuration, the actuator 120 is an annular shape disposed about the micro-applicator plate 114. In another configuration, not specifically shown, the actuator 120 can be integrally formed with the micro-applicator plate 114 such that supplying power to the micro-applicator plate 114 oscillates the plate 114. In the example provided, a control module 164 is in electric communication with the actuator 120 to provide power to and control operation of the actuator 120.

Still referring to FIG. 4, the material M is supplied to the reservoir 134 at a very low pressure or no pressure, such that surface tension of the material M resists the material M from flowing through the apertures 112 of the micro-applicator plate 114 unless the actuator 120 is activated and oscillates. That is, when the actuator 120 is activated and vibrates, the material M is ejected through and/or from the plurality of apertures 112 to provide a stream 5 of atomized droplets 3. The stream 5 of atomized droplets 3 propagates generally parallel to a micro-applicator axis 2' and forms a coating C on a surface s' of the substrate S. The substrate S can be any suitable workpiece such as a vehicle part, frame, or body for example. As schematically depicted in FIG. 4, the atomized droplets 3 have a narrow droplet size distribution (e.g., average droplet diameter). In the example provided, a particle or debris 138, such as solid debris or a large metal flake, is oriented so that it blocks one of the apertures 112. The debris 138 can inhibit or prevent the material M from being ejected from that aperture 112, which can cause the coating C to become less than optimally distributed.

The nozzle body 116 further includes a connector. In the example provided, the nozzle body 116 is a cylindrical body and the connector includes external threads 142 disposed about the radially outer surface of the nozzle body 116. The threads 142 are configured to mate with internal threads 146 disposed about the inner wall 132 of the array body 100. The threads are configured such that the nozzle body 116 can be reversibly connected to the array body 100. In other words, the nozzle body 116 can be screwed out of the array body 100, turned around so that the opposite side of the micro-applicator plate 114 faces the back wall 131, and then screwed back into the array body 100. In the example provided, the threads 142 and mating threads 146 form a fluid-tight seal. In an alternative configuration, not specifically shown, a separate seal (e.g., an o-ring, washer, face seal, etc.) can be used to seal the nozzle body to the array body 100.

The nozzle body 116 includes a plurality of grip features configured to permit a tool (not shown) to easily grip and rotate the nozzle body 116 relative to the array body 100. In the example provided, the grip features are rectangular recesses 150 that are diametrically opposite each other so that prongs of the tool (not shown) can be received within the recesses 150 to rotate the nozzle body 116. In the example provided, the micro-applicator plate 114 is disposed axially midway between the opposite axial ends of the nozzle body 114 and the nozzle body 116 is axially symmetric about the plane defined by the micro-applicator plate 114.

When the debris 138 clogs the aperture 112, the nozzle body 116 can be disconnected from the array body 100, reversed, and then reconnected to the array body 100. Then, the debris 138 is cleared from the aperture 112 by either activating the actuator 120 so that the material M pushes the debris 138 out, or by flushing the apertures 112 with a different fluid (e.g., air or a cleaning fluid) supplied from the inlet 136.

Referring to FIG. 5, a cross-section of a material applicator 10' of a second construction is illustrated. The material applicator 10' is similar to the material applicator 10 (FIGS. 1-4) except as otherwise shown or described herein. Features denoted with primed reference numerals are similar to the features shown and described in FIGS. 1-4 with similar, but non-primed reference numerals and only differences are described herein. The material applicator 10' includes a connector on the nozzle body 116' that reversibly connects to a mating connector on the array body 100', similar to the nozzle body 116 and array body 100 (FIGS. 1-4), except that instead of mating threads, the connectors are a quick-connect type of connector.

In the example provided, the nozzle body 116' includes a male quick-connect fitting 510 and the array body 100' includes a female quick-connect fitting 514. The male quick-connect fitting 510 is reversible such that can mate with the female quick-connect fitting 514 in either axial direction. In an alternative configuration, not specifically shown, the array body 100' includes a male quick-connect fitting and the nozzle body 116' includes a reversible female quick-connect fitting.

In the example provided, the male quick-connect fitting 510 includes a locking groove 518, a first sealing surface 522, and a second sealing surface 526 that extend circumferentially about the nozzle body 116'. The groove 518 is disposed axially between the two sealing surfaces 522 and 526. The sealing surfaces 522, 526 are configured to contact and seal with a mating sealing surface 530 disposed about an interior of the female quick-connect fitting 514. The female quick-connect fitting 514 includes a plurality of locking balls 534 that are circumferentially spaced about the female quick-connect fitting 514 and configured to move radially between a locked position (shown) and an unlocked position. In the locked position, the balls 534 extend radially inward a greater extent than when in the unlocked position and can be captured within the groove 518 to engage a shoulder of the groove to prevent axial withdrawal of the male quick-connect fitting 510. A collar 538 of the female quick-connect fitting 514 is movable in the axial direction to permit or prevent the balls from moving between the locked position and the unlocked position, depending on the axial position of the collar 538. While one specific type of quick-connect fitting is illustrated, other types can be used.

Referring to FIG. 6, a cross section of a material applicator 10" of a third construction is illustrated. The material applicator 10" is similar to the material applicator 10 (FIG. 1-4) or 10' (FIG. 5) except as otherwise shown or described herein. Features denoted with double primed reference numerals are similar to the features shown and described in FIGS. 1-4 with similar, but non-primed reference numerals, or FIG. 5 with similar, but primed reference numerals, and only differences are described herein.

The array body 100" includes a connector configured to reversibly connect to a mating connector on the base 140". In the example provided, the connector includes external threads 610 disposed about a radially outer surface of the array body 100" that are configured to mate with internal threads 614 on the base 140". The threads 610, 614 are configured such that the array body 10" can be unscrewed from the base 140", turned around until the opposite side of the array body 100" faces the base 140", then screwed back into the base 140". While threads are illustrated, the connectors can be other types of reversible connectors, such as a quick-connect similar to that shown in FIG. 5. While the material M is illustrated as being provided to all of the micro-applicators 110" from a common inlet 136", each micro-applicator 110" can receive material M from individual inlets (not shown). The micro-applicators 110" can be non-reversible relative to the array body 100", or can each be reversibly coupled to the array body 100" as shown and described above with reference to FIGS. 1-5.

Referring to FIG. 7, a method 710 of operating an applicator to apply a coating to a substrate is illustrated in flow chart format. The method can be used with any of the applicators 10, 10', or 10" (FIGS. 1-6) to keep debris from clogging the applicator. At step 714, the coating material (e.g., material M) is provided to the nozzle of the applicator such as from the inlet 136, 136', or 136". The method 710 proceeds to step 718, where power is provided to the nozzle's actuator(s) to oscillate the micro-applicator plate(s) and eject droplets of the material from the apertures of the micro-applicator plate(s) toward the substrate until a desired coating thickness is achieved.

The method 710 then proceeds to step 722, where the orientation of one or more of the micro-applicator plates is reversed so that the flow of the material will be in the opposite direction through the apertures in the micro-applicator plate(s). In one configuration, the orientation of the micro-applicator plate is reversed in response to a blockage being detected.

According to one aspect of the present disclosure, a blockage is determined to have occurred when a pressure changes within the reservoir or within the conduits upstream of the nozzle that supply the material to the nozzle. For example, the pressure can be detected by a pressure sensor 160, 160', 160" (shown in FIGS. 4-6) and the pressure detected by the sensor 160, 160', 160" may increase as a result of one or more apertures of the micro-applicator plate being blocked. The sensor 160, 160', 160" is in communication with the control module 164, 164', 164" (shown in FIGS. 4-6) which can indicate to an operator that the micro-applicator plate needs to be reversed and/or the control module 164, 164', 164" can move the applicator to automatically reverse the orientation of the micro-applicator plate without requiring input from an operator. For example, the control module 164, 164', 164" can control the robotic arm 4 (FIG. 1) and/or other corresponding tooling to automatically reverse the micro-applicator plate orientation.

According to another aspect of the present disclosure, the control module 164, 164', 164" can be configured to automatically reverse the nozzle orientation upon completion of a particular coating process. For example, the control module 164, 164', 164" can control the robotic arm 4 (FIG. 1) and/or other corresponding tooling to automatically reverse the micro-applicator plate orientation when a different coating fluid material or a different coating color is needed, or upon completion of coating each vehicle. The control module can be configured to reverse the nozzle regardless of whether a blockage is detected in order to routinely clear any blockages.

The micro-applicator plate can be reversed by either reversing the individual nozzle body or bodies as shown in FIGS. 4 and 5, or by reversing the entire array body 100" as shown in FIG. 6.

The method 710 can optionally proceed to step 726. At step 726, the blockage is ejected from the micro-applicator plate by flushing the nozzle with air and/or a cleaning fluid before proceeding to step 730.

After step 722 or after optional step 726, the method proceeds to step 730, where fluid material (e.g., more of material M, or a different coating material such as a different color or a clear-coat) is provided to the nozzle.

The method then proceeds to step 734. At step 734, power is provided to the actuator to oscillate the micro-applicator plate and spray the material toward the workpiece. If the nozzle has not been flushed after reversing the orientation, the blockage is still cleared when the actuator oscillates the micro-applicator plate since the fluid coating material will eject the blockage. Since the blockage can be cleared at step 734 without optional step 730, omitting step 730 can save time and reduce the amounts of the materials used, since the supply lines do not need to be flushed to clear the blockage.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A nozzle for an atomizer comprising:
a plate defining an aperture;
a piezoelectric actuator configured to oscillate the plate;
a body supporting the plate perpendicular to an axis of the body; and
a connector including threads disposed on the body and configured to removably and reversibly threadably mount the body to mating threads of a mating connector of the atomizer such that the body can be selectively switched between being mounted in a first orientation wherein fluid exits the nozzle along a first axial direction through the aperture, and a second orientation wherein fluid exits along an opposite axial direction through the aperture,
wherein the body defines a plurality of first grip features and a plurality of second grip features, the first grip features being configured to be engaged by a tool to rotate the body relative to the base when the threads are threadably engaged with the mating threads in the first orientation and the second grip features being configured to be engaged by the tool to rotate the body relative to the base when the threads are threadably engaged with the mating threads in the second orientation,
wherein the first grip features and the second grip features are recesses defined by the body at opposite axial ends of the axis and configured to be engaged by the tool to rotate the body relative to the base when the threads are threadably engaged with the mating threads.

2. The nozzle according to claim 1, wherein the plate is approximately midway between opposite axial ends of the body.

3. The nozzle according to claim 1, wherein the piezoelectric actuator is disposed about the plate.

4. The nozzle according to claim 1, wherein the piezoelectric actuator is integrally formed with the plate.

5. The nozzle according to claim 1, wherein the plate is one of a plurality of plates coupled to the body in an array, each plate defining at least one aperture.

6. The nozzle according to claim 1, wherein the plate defines a plurality of apertures.

7. The nozzle according to claim 1, wherein when the nozzle is in the first orientation, the atomizer, the body, and a first side of the plate cooperate to define a reservoir, and wherein when the nozzle is in the second orientation, the atomizer, the body, and an opposite side of the plate define the reservoir.

8. The nozzle according to claim 5, wherein the piezoelectric actuator is one piezoelectric actuator of among a plurality of piezoelectric actuators, each piezoelectric actuator being supported by the body and configured to oscillate a corresponding one of the plates.

9. An atomizer comprising the nozzle according to claim 1.

10. The nozzle according to claim 1, wherein the threads are external threads and the mating threads are internal threads.

11. A nozzle for an atomizer comprising:
a plate defining an aperture;
a piezoelectric actuator configured to oscillate the plate; and
a body disposed about an axis and supporting the plate perpendicular to the axis, the body including external threads configured to threadably engage internal threads on a base in a first orientation wherein fluid from the base exits the nozzle along a first direction through the aperture, and a second orientation wherein fluid from the base exits the nozzle along an opposite direction through the aperture,
wherein the body defines a plurality of first grip features and a plurality of second grip features, the first grip features being configured to be engaged by a tool to rotate the body relative to the base when the internal and external threads are threadably engaged in the first orientation and the second grip features being configured to be engaged by the tool to rotate the body relative to the base when the internal and external threads are threadably engaged in the second orientation,
wherein the first grip features and the second grip features are recesses defined by the body at opposite axial ends of the axis and configured to be engaged by the tool to rotate the body relative to the base when the internal and external threads are threadably engaged.

12. An atomizer comprising the nozzle according to claim 11.

13. A nozzle for an atomizer comprising:
a plate defining an aperture;
a piezoelectric actuator configured to oscillate the plate; and
a body disposed about an axis and supporting the plate perpendicular to the axis, the body including a reversible male quick-connect fitting configured to be releasably coupled to a female quick-connect fitting of a base in a first orientation wherein fluid from the base exits the nozzle along a first direction through the aperture, and a second orientation wherein fluid from the base exits the nozzle along an opposite direction through the aperture,
wherein the reversible male quick-connect fitting includes a first sealing surface and a second sealing surface, wherein the female quick-connect fitting includes a mating sealing surface, wherein the mating sealing surface is configured to seal with the first sealing surface when the reversible male quick-connect fitting is in the first orientation to inhibit the fluid from exiting the nozzle between the first sealing surface and the mating sealing surface, and wherein the mating sealing surface is configured to seal with the second sealing surface when the reversible male quick-connect fitting is in the second orientation to inhibit the fluid from exiting the nozzle between the second sealing surface and the mating sealing surface,
wherein the female quick-connect fitting includes a locking member that is movable between a locked position and an unlocked position that is radially outwards of the locked position, wherein when the reversible male quick-connect fitting is in the first orientation and the locking member is in the locked position, the locking member engages the reversible male quick-connect fitting to inhibit removal of the reversible male quick-connect fitting from the female quick-connect fitting, and wherein when the reversible male quick-connect fitting is in the first orientation and the locking member is in the locked position, the locking member engages the reversible male quick-connect fitting to inhibit removal of the reversible male quick-connect fitting from the female quick-connect fitting.

14. The nozzle according to claim 13, wherein the reversible male quick-connect fitting includes a groove axially between the first and second sealing surfaces, wherein the locking member is configured to be received in the groove when the reversible male quick-connect fitting is in the first orientation and when the reversible male quick-connect fitting is in the second orientation.

15. The nozzle according to claim 13, wherein the female quick-connect fitting includes a collar and a plurality of locking balls, the locking member being one locking ball of the plurality of locking balls, each locking ball being radially movable between a corresponding locked position and a corresponding unlocked position that is radially outward of the corresponding locked position, wherein the collar is movable between a first position in which the collar holds the locking balls in their corresponding locked positions and a second position in which the locking balls are permitted to move to their corresponding unlocked positions.

\* \* \* \* \*